June 25, 1968  J. G. SULLIVAN ET AL  3,389,744

FREEZING METHOD AND APPARATUS

Filed May 18, 1966  2 Sheets-Sheet 1

INVENTORS:
JOSEPH G. SULLIVAN
LAWRENCE A. SOFFA
JOHN R. EAGLESON
BY Howson & Howson
ATTYS.

June 25, 1968 J. G. SULLIVAN ET AL 3,389,744
FREEZING METHOD AND APPARATUS
Filed May 18, 1966 2 Sheets-Sheet 2

INVENTORS:
JOSEPH G. SULLIVAN
LAWRENCE A. SOFFA
JOHN R. EAGLESON
BY Howson & Howson
ATTYS United States Patent Office 3,389,744
Patented June 25, 1968

3,389,744
FREEZING METHOD AND APPARATUS
Joseph G. Sullivan and Lawrence A. Soffa, Pueblo, Colo., and John R. Eagleson, Oreland, Pa., assignors to Acme Markets, Inc., Philadelphia, Pa., a corporation of Delaware
Filed May 18, 1966, Ser. No. 551,049
7 Claims. (Cl. 165—2)

ABSTRACT OF THE DISCLOSURE

An improved method and apparatus for freezing food items especially food products contained in packages having a transparent cover comprising cooling means, for example, a freezer plate on which the side of the package remote from the transparent cover engages and maintains the cooling means at a temperature substantially below the freezing temperature of the product and heating means spaced from and confronting the transparent cover adapted to maintain the temperature adjacent the cover slightly above the freezing temperature of the product so that the temperature of the outer surface of the product is above the dew point of the surrounding air at the top of the package. After a predetermined freezing cycle, the product is frozen by conduction to the freezer plate. Further by this method the moisture in the package migrates to the coldest point, that is, the bottom of the package with the result that no frost develops on the transparent top cover of the package and additionally it has been found that in accordance with the process of the present invention dehydration and discoloration of the food product is eliminated and hence, the product has a substantially longer shelf life.

The present invention relates to new and improved method and apparatus for freezing food items and particularly to a new and improved method and apparatus for freezing food items packaged in containers. The present invention is especially suitable for freezing food items such as meat patties packaged in containers having a transparent top cover.

In accordance with a prior art method for freezing food items such as meat patties, the meat patties are transported through an enclosed chamber on an endless foraminous conveyor and a high velocity, low temperature air forced through jets located above the conveyor is directed against and over the meat patties to freeze the same. Thereafter, the frozen meat patties are placed in containers either by automatic means or manually and then the packaged product is ready for storage in a freezer from where it is shipped to the retail store. Even though this method provides a fast freezing time, nevertheless, it has certain drawbacks. For example, it has been found that this direct air blast freezing method results in substantial shrinkage of the product with the result that some of the natural product juices are lost. Of course, loss of natural juices of the meat affects the flavor of the finished cooked product.

It has also been found that in this type of freezing method there is a problem of heavy dehydration and freezer burns with the resultant loss of product flavor. Thus, the product has a limited shelf life. Other objections to this method are the fact that the meat patties have a frosty appearance and that in some cases there is discoloration of the meat patties.

In accordance with another prior freezing method, the food items are first packaged in containers and then these containers are placed in so-called "double contact plate freezers." These "plate" freezers generally comprise a plurality of refrigerated plates enclosed in an insulated cabinet, the plates being adapted to be raised or lowered relative to one another. The packages containing the food items are placed on each of the plates or stations with the plates in their open position. When loading is completed, the plates are lowered with pressure being exerted to maintain complete surface contact between the plates and the top and bottom of the packages. Refrigerant is then circulated through the plates absorbing heat from the underside of the package above it and from the top side of the package immediately under it.

In some instances, the food items frozen in the "double contact freezers" are simply packaged in open containers and after the products are removed from the freezer, a cellophane wrap is applied over the open end of the container.

However, it has been found that when the food items are processed in open packages, dehydration of the exterior surface of the food results and, in the case of meats, they turn a dull color. Dehydration, of course, adversely affects the flavor of the cooked product. It has also been observed, as in the case of blast freezers, that there is a shrinkage problem.

In other instances, the open side of the packages is covered with a transparent cover such as cellophane and then the packages are processed in the double contact freezers. The major problem in this instance is that frost tends to form on the transparent cover which is undesirable for the reason that the purchaser cannot thoroughly examine the contents of the package. Furthermore, even in these cases, it has been found that there is a certain amount of shrinkage, dehydration and discoloration of the food products which, as noted above, is undesirable.

The present invention eliminates or obviates many of the disadvantages or drawbacks of the prior freezing methods discussed above. The present invention is directed to a new and improved method and apparatus for freezing food items. In accordance with the present invention, the temperature at one side of the product is maintained substantially below the freezing temperature of the product by a freezer plate and the temperature at the other side of the product is maintained at a higher temperature for example, at a temperature above the freezing temperature of the product for a substantial portion of the freezing cycle until the other side of the product is frozen by conduction to the freezer plate.

More particularly the present invention relates to the freezing of food items packaged in containers having a transparent top cover made, for example of cellophane so that the contents of the package may be examined therethrough. In accordance with the present method, the packages are placed in an enclosed chamber and the temperature is controlled in a predetermined manner in the chamber by means including a freezer plate so that the products are frozen from the bottom of the package and the top surface of the package is kept above freezing temperature of the product for a substantial portion of the freezing cycle until the top surface is frozen by conduction to the freezer plate. For most meat, the freezing temperature of the product is approximately between 26°–29° F. This freezing temperature can vary depending on composition of product. By this method, the moisture in the package migrates to the coldest point, that is, the bottom of the package with the result that no frost develops on the transparent top cover of the package since the dew point within the package has been lowered well below the temperature required to finally freeze the food products in the container. In other words, the temperature in the chamber is controlled in a manner so that the temperature of the top surface of the food product and the temperature on the inside of the transparent cover is above the dew point of the surrounding air in the top of the package.

In the embodiment of the invention illustrated, the freezer apparatus is provided with at least one enclosed chamber which is defined by a refrigeratable plate on which the packages containing the food items are supported and through which a suitable refrigerant is circulated to provide a temperature of between —40° and —50° F. at the top surface of the plate and an insulated top cover spaced from the freezer plate which mounts heating means, for example, heater strips. The apparatus further includes temperature sensing means at a level in the chamber adjacent the transparent top cover of the container which is cooperatively associated with the heater control means to selectively increase or decrease the heat given off by the heating means when the temperature adjacent the top of the packages varies from a predetermined selected temperature in the freezing cycle. More specifically in the case of freezing meat products, the temperature sensing means is set to automatically control the heating means so that the temperature adjacent the top of the package is in the vicinity of 27° to 30° F. for substantially the entire freezing cycle. For other products the temperature conditions would be controlled to freeze in the manner discussed above.

The present method provides numerous advantages over the conventional "blast freezing" method and the "double contact plate freezer" method described above. In accordance with the present invention, the transparent wrap for the package is frost free at the end of the freezing cycle which, of course, is desirable since the consumer may examine the contents of the package carefully.

Furthermore, it has been found that shrinkage of the products is substantially eliminated and accordingly, the weight loss attended to shrinkage is negligible. Additionally, it has been found that in accordance with the present invention dehydration and discoloration of the food product is eliminated and hence the product has a substantially longer shelf life.

In accordance with the present freezing method, the product juices are held within the meat in contrast to the prior method discussed above where the product surface temperature is not controlled. Of course, by retaining the natural juices in the meat, a superior flavor results in the cooked products. This contrasts with the prior types discussed above where there is a problem of heavy dehydration and freezer burns and there is a resultant loss of flavor and shelf life.

The present invention provides substantial improvements over the air blast method discussed above. For example, since packaging is completed prior to freezing, substantial handling and the resulting cost of handling are minimized. In accordance with the present invention, a straight-line production technique is suitable, there are no trays or racks to be cleaned, purchased or chilled and the labor involved in moving the food product on trays in and out of the blast freezer is eliminated. Further in accordance with the present method, it is not necessary to shield the product with polyethylene as is done in many blast freezers to keep the wind away from the product.

In the present method there is full protection in the air space between the meat and the cellophane overwrap in the head space of the box of the enclosed chamber. The shelf life of the frozen product processed in accordance with the present invention is superior for the reason that the frozen product has better palatability and frost-free appearance thereby raising the quality of the product going into the storage freezer. This results in a better product to the consumer.

The major advantages of the freezing method and apparatus of the present invention over the "double contact" plate freezer is the elimination of the frost on the transparent wrap of the container. In addition to this advantage, the food product processed in accordance with the present invention is superior for the reasons noted above.

With the foregoing in mind, an object of the present invention is to provide a new and improved system for freezing packaged food items whereby the products may be processed in a highly economical manner with a minimum of handling.

Another object of the present invention is to provide a method and apparatus for freezing food products packaged in containers having a transparent window wherein the accumulation of frost on the transparent window is substantially eliminated and the various characteristics such as palatability and flavor retention in the product are high.

Still another object of the present invention is to provide apparatus for processing packaged food items in a manner described above which is of comparatively simplified construction and wherein the conditions for carrying out the process may be controlled very accurately.

These and other objects of the present invention and the various features and details of the construction and operation of the apparatus and the steps of the method are hereinafter more fully set forth with reference to the accompanying drawings, wherein.

Even though the freezing method and apparatus of the present invention are described hereinafter as directed to the freezing of meat products in packages, it is, of course, to be understood that the principle of the invention applies also to the freezing of other types of food products with or without a container.

Figure 1:
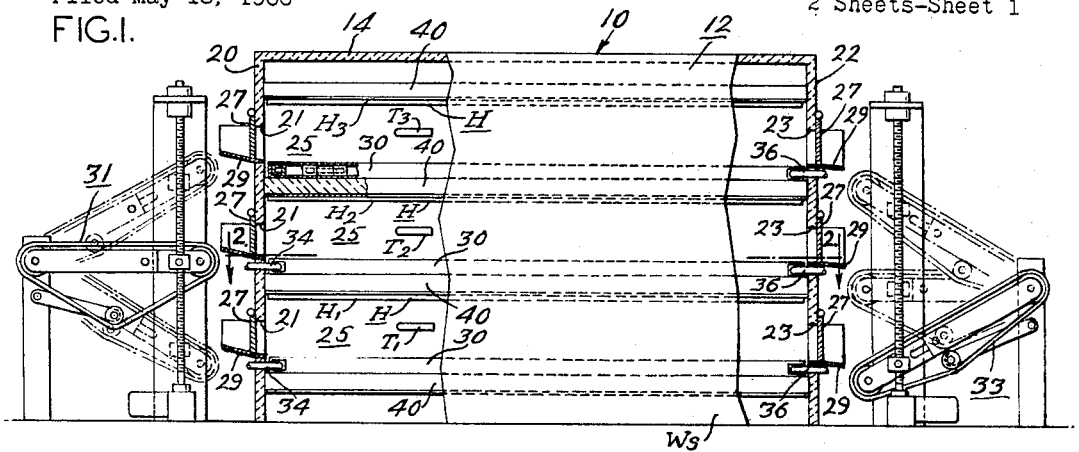
FIG. 1 is a side elevational view partly in section of apparatus for freezing packaged foods in accordance with the present invention.
Figure 2:
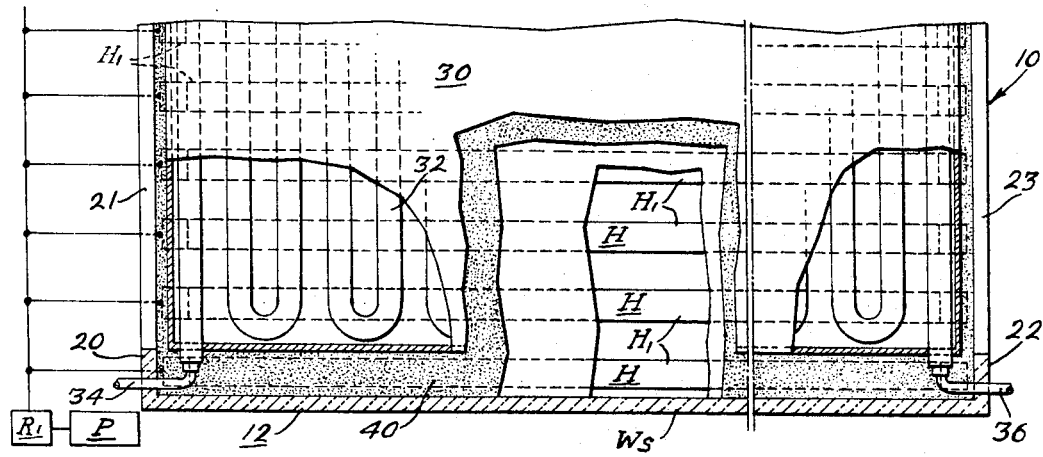
FIG. 2 is an enlarged fragmentary sectional view taken on lines 2—2 of FIG. 1.
Figure 3:
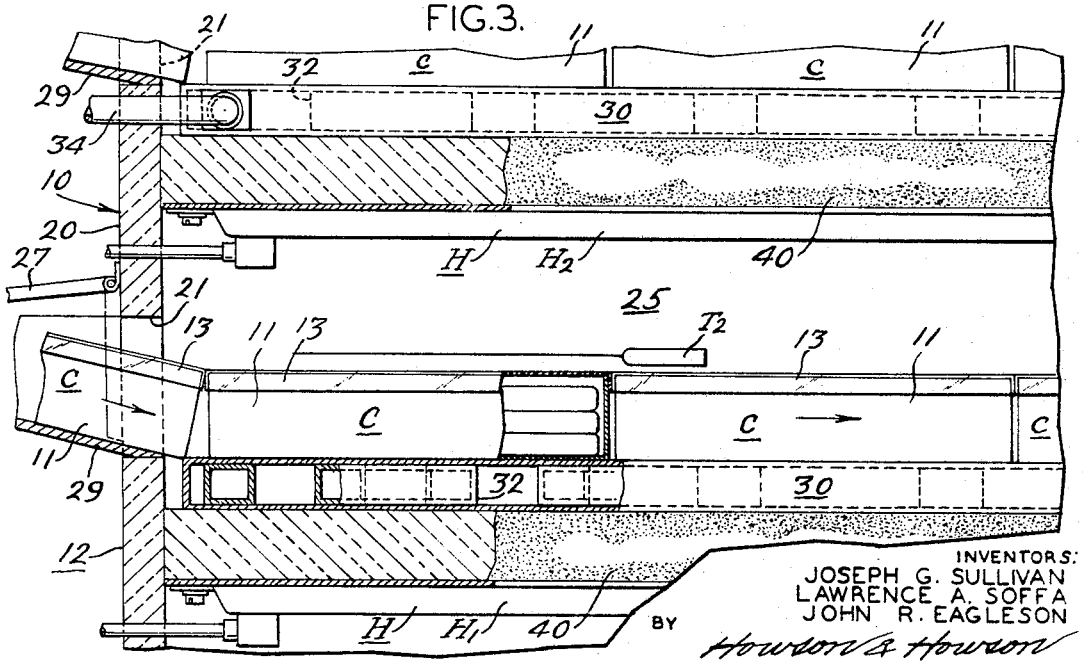
FIG. 3 is an enlarged fragmentary sectional view showing a portion of one of the chambers of the freezer apparatus.
Figure 4:
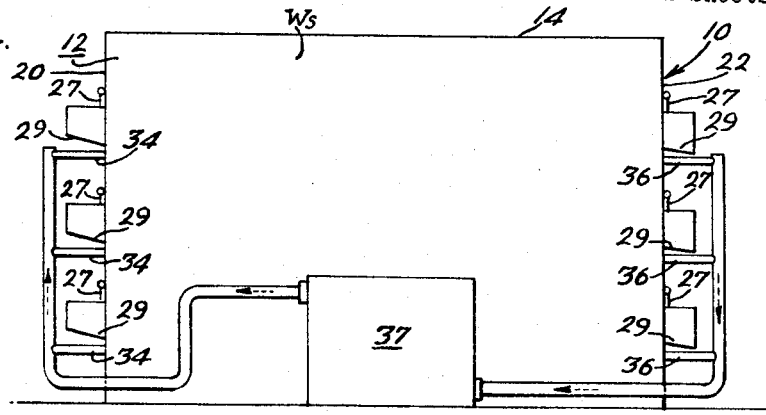
FIG. 4 is a side elevational view of the freezer apparatus schematically showing the refrigeration system for the freezer plates.

Referring now to the drawings and particularly to FIG. 1 thereof, there is shown apparatus generally designated by the numeral 10 constructed in accordance with the present invention for freezing food items packaged in containers C. In the present instance the containers C comprise a shallow tray 11 made of cardboard and a transparent top cover 13 made of plastic or like material.

The apparatus 10 comprises a generally enclosed housing 12 having a top wall 14, spaced parallel side walls $W_s$ and front and rear enclosure walls 20 and 22. The housing is divided in the present instance into a plurality of chambers or compartments 25 which, as illustrated, extend longitudinally of the housing and form a plurality of tiers.

A plurality of generally rectangular aligned entrance and discharge openings 21 and 23 are provided in the front and rear enclosure walls 20 and 22 to permit the packaged food items to be introduced into the compartments 25 in one end of the housing 10 and discharged at the other end.

Associated with each of these openings there is a pivotally mounted door 27 and a guide ramp 29 to guide packages into and out of the housing. In the present instance, and as best illustrated in FIG. 1, endless belt conveyor means 31 and 33 are provided adjacent the entrance and discharge ends of the housing to facilitate movement of packaged food items into and out of the compartments 25 of the housing. The conveyors at the entrance and discharge ends of the housing are adjustably mounted so that they may be raised and lowered to facilitate delivery of the containers to the various compartments at different levels.

In accordance with the present invention, the temperature conditions in the compartments of the housing are controlled in a predetermined manner to freeze the food products in the containers C so that the transparent cover 13 of each of the containers is substantially frost free and clear to permit visual inspection of the food products in the container. By the present method, the food products are frozen in a manner whereby they maintain their original bloom and appearance, free of frost and burns. The principle of the present invention is to maintain the temperature of the top surface of the products and of the inside of the transparent cover of the container above the dew point of the surounding air in the top of the package. In the present instance this is accomplished by freezing the food products, such as meat having a freezing temperature of between approximately 26°–29° F., from the bottom of the package, that is by maintaining the temperature at the bottom of the package in the vicinity of the plates 30 at a temperature below freezing, for example, between —40 F. and —50° F. and by maintaining the temperature in the zone above the containers in the vicinity of the transparent cover at a higher tempreature, for example, in the neighborhood of 27° to 30° F. for substantially the entire freezing cycle. For other products the temperature in this area would be maintained in approximately the same relation to the freezing point of the product.

Considering now more specifically the details and arrangement of the freezer apparatus, the bottom of each compartment 25 is defined by a refrigeratable plate 30 and the top of each compartment 25 is defined by a layer 40 of insulating material adn depending from the lower face of each of the layers 40 there is provided heating means in the form of a plurality of longitudinally extending electrical heating strips H. Each of the plates 30, as illustrated, is a hollow member of generally rectangular form and mounts therein a coil 32 of serpentine configuration through which a suitable liquid refrigerant is circulated. Inlet and outlet conduits 34 and 36 are connected to the terminal ends of each of the coils which in turn are connected to a conventional refrigeration system 37, which is adapted to circulate the liquid refrigerant through the coils 32.

Figure 6:
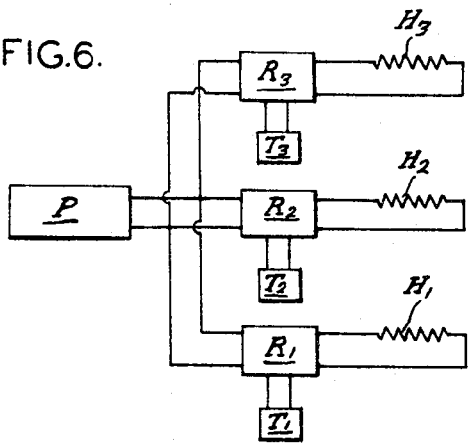
FIG. 6 is a schematic showing of the electrical circuitry for the heater strips in the various compartments of the freezer apparatus.

In the present instance, the aparatus illustrated has three compartments and, as illustrated in FIG. 6, the heating strips $H_1$, $H_2$ and $H_3$ for all of the compartments 25 are connected to a suitable electrical power suply source P and there is provided control means including relays $R_1$, $R_2$, and $R_3$ for selectively controlling the amount of heat given off by the heating strips $H_1$, $H_2$ and $H_3$ in each compartment.

In the present instance, in order to control the freezing of the food items packaged in the containers in the manner described above, there is provided a temperature sensing means in each of the compartments in the form of thermostats or thermocouples $T_1$, $T_2$, and $T_3$ disposed at a level adjacent the top of the containers which are operatively connected with the respective relays $R_1$, $R_2$, and $R_3$ for the heating strips in each of the compartments. By this arangement the refrigerating system 37 may be set to provide a predetermined, uniform temperature at the bottom of the containers, for example, in the vicinity of between —40° F. and —50° F. and the thermostats or thermocouples $T_1$, $T_2$ and $T_3$ are set to sense temperature variation at the top of the containers above or below the desired temperature, that is, in the range of about 27°–30° F. for meat having a freezing temperature of about 26°–29° F. and selectively effect through the relays a greater heat output of the heating strips if the temperature at the sensing point is lower than the desired temperature. If the temperature at the sensing point is higher than the desired temperature, the heat output of the strips is lowered.

Considering now the operation of the freezing apparatus of the present invention and with reference to the freezing for example of meat patties packaged in containers C having a transparent top cover 13, the refrigeration system 37 is set to circulate refrigerant through the coils 32 of each of the compartments to provide a predetermined, uniform temperature at the top surface of each of the plates 30, the temperature being in the range of —40° to —50° F. The containers C are then delivered to the various compartments of the apparatus by means of the loading conveyor 31. This conveyor, as noted previously, is selectively movable relative to the entrance end of the housing so that all of the compartments may be loaded automatically. During the initial loading operation, the doors at the entrance end of the housing are open and the doors at the discharge end of the housing are closed. Now in the case of freezing meat patties, the temperature sensing means $T_1$, $T_2$, and $T_3$ in each compartment senses temperatures that vary from about 27° and 30° F. and if the temperature sensed varies from the desired temperature of about 27° to 30° F., the heat output of the heating strips is changed through the relays to maintain the temperature at the sensing point substantially uniform. When the packages have been in the freezer a predetermined length of time to effect freezing of the meat patties, that is, when the latent heat of freezing is removed as indicated by rapid temperature drop of top surface of the meat, this determines the end of the freezing cycle (see chart, portions in brackets).

The containers C then may be discharged from the apparatus by opening the doors at the discharge end of the housing and then the containers are moved on the discharge conveyor which may deliver the containers to a storage freezer.

Figure 5:
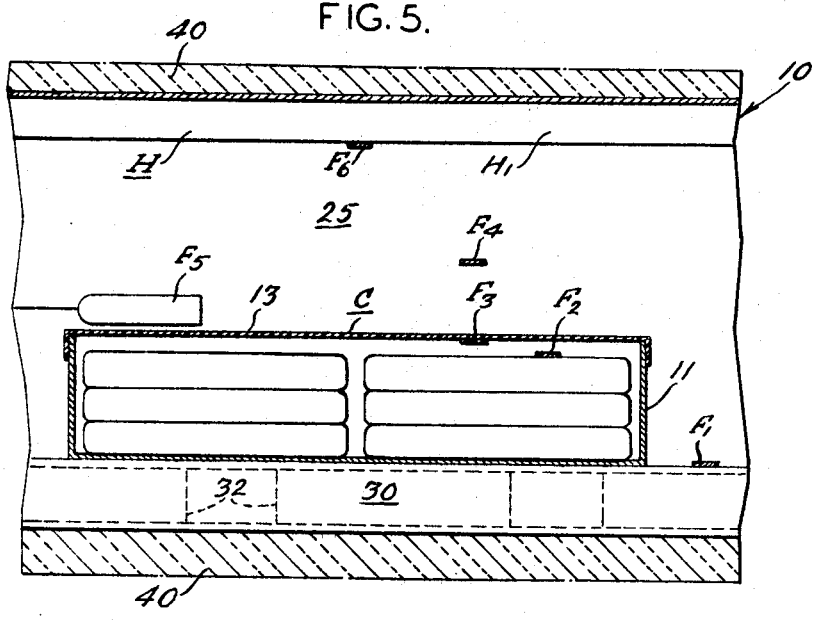
FIG. 5 is an enlarged transverse sectional view through one of the compartments of the freezer apparatus.

Tests were conducted for freezing meat patties in a freezer apparatus constructed in accordance with the present invention and various temperature sensing means were placed in selected locations in the apparatus and containers C for the product as illustrated in FIG. 5. With reference to FIG. 5, the temperature readings were taken at the surface of the refrigeratable plate 30 as at $F_1$, at the top surface of the meat product as at $F_2$, at the inside of the top cover 13 as at $F_3$, in the air space above the container C as at $F_4$, at a point immediately adjacent the top of the package as at $F_5$ and at the heater strip as at $F_6$. The chart below shows the temperature recorded at these various points during a typical freezing cycle.

| Time | F1 | F2 | F3 | F4 | F5 | F6 |
|---|---|---|---|---|---|---|
| 7:20 | —44° | 29° | 23° | 35° | 31° | 70° |
| 7:30 | —47° | 29° | 27° | 34° | 30° | 44° |
| 7:40 | —42° | 29° | 29° | 35° | 30° | 74° |
| 7:50 | —46° | 28° | 27° | 34° | 30° | 49° |
| 8:00 | —41° | 29° | 29° | 35° | 31° | 79° |
| 8:10 | —44° | 29° | 28° | 34° | 30° | 48° |
| 8:20 | —46° | 29° | 30° | 34° | 30° | 75° |
| 8:30 | —46° | 25° | 28° | 31° | 30° | 55° |
| 8:40 | —46° | 25° | 27° | 33° | 30° | 75° |
| 8:50 | —42° | [23° | 24°] | 29° | 30° | 49° |
| 9:00 | —46° | [15° | 22°] | 29° | 30° | 75° |
| 9:10 | —45° | [ 9° | 20°] | 28° | 30° | 82° |

While a particular embodiment of the present invention has been illustrated and described herein, it is not intended to limit the invention and changes and modifications may be made therein within the scope of the following claims.

We claim:

1. A method for freezing food products consisting of the steps of maintaining by means including a freezer means, a temperature at one side of the product substantially below the freezing temperature of the phoduct and maintaining by means of heating means spaced from the other side of the product the temperature at the other side of the product at a temperature above the freezing temperature of the product for substantially the entire freezing cycle until the other side of the product is frozen by conduction to the freezer means.

2. A method for freezing food products contained in packages having a transparent cover consisting of the steps of maintaining a temperature at one side of the package remote from the cover substantially below the freezing temperature of the product and maintaining by means of heating means confronting and spaced from the cover the temperature adjacent the cover slightly above the freezing temperature of the product so that the surface product temperature at the surface of the product and cover temperature are above the dew point of the surrounding air in the top of the package so that the cover is frost free.

3. A method for freezing food products having a freezing temperature between about 26° F.–29° F. consisting of the steps of maintaining a temperature at one side of the product substantially below the freezing temperature of the product of about −40° F. and −50° F. and maintaining by means of heating means spaced from the other side of the product the temperature at the other side of the product slightly above the freezing temperature of the product in the vicinity of 27° to 30° F. for a substantial portion of the freezing cycle.

4. A method for freezing food products consisting of the steps of cooling one side of the product to a temperature substantially below the freezing temperature of the product, heating the other side of the product, sensing the temperature at the other side of the product and controlling the heating in response to the sensing to maintain the other side of the product slightly above the freezing temperature of the product for a substantial portion of the freezing cycle.

5. Apparatus for freezing food products comprising cooling means for maintaining a temperature at one side of the product substantially below the freezing temperature of the product and heating means spaced from the other side of the product for maintaining the temperature at the other side of the product slightly above the freezing temperature of the product for a substantial portion of the freezing cycle.

6. Apparatus for freezing food products contained in packages having a transparent cover comprising cooling means for maintaining a temperature at one side of the package remote from the cover substantially below the freezing temperature of the product and heating means spaced from and confronting the cover for maintaining the temperature adjacent the cover slightly above freezing temperature of the product so that the temperature of the outer surface of the product is above the dew point of the surrounding air in the top of the package.

7. Apparatus for freezing food products comprising cooling means for maintaining a temperature at one side of the product substantially below the freezing temperature of the product, heating means for heating the other side of the product, sensing means for sensing the temperature at the other side of the product and control means operatively connected to the heating means and sensing means to maintain the temperature at the other side of the product slightly above the freezing temperature of the product for a substantial portion of the freezing cycle.

References Cited

UNITED STATES PATENTS

| | | | |
|---|---|---|---|
| 2,608,831 | 9/1952 | Steelman | 165—21 |
| 3,282,331 | 11/1966 | Foster et al. | 165—30 |

ROBERT A. O'LEARY, *Primary Examiner.*

CHARLES SUKALO, *Examiner.*